United States Patent [19]
Hayashi et al.

[11] Patent Number: 5,135,083
[45] Date of Patent: Aug. 4, 1992

[54] INPUT RESPONSIVE DAMPER

[75] Inventors: Katsuhiko Hayashi; Sadao Fujishige, both of Nagano, Japan

[73] Assignee: Sankyo Seiki Mfg. Co., Ltd., Nagano, Japan

[21] Appl. No.: 533,500

[22] Filed: Jun. 5, 1990

[30] Foreign Application Priority Data

Jun. 7, 1989 [JP] Japan .................. 1-144460

[51] Int. Cl.⁵ .......................... F16D 57/00
[52] U.S. Cl. .................. 188/290; 188/267; 188/184; 16/64; 16/49
[58] Field of Search ........... 188/184, 267, 290, 161, 188/162; 16/64, 49

[56] References Cited

U.S. PATENT DOCUMENTS

| | | | |
|---|---|---|---|
| 3,935,614 | 6/1991 | Pannone et al. .................. | 16/49 |
| 4,130,030 | 12/1978 | Stratienko ........................ | 74/625 |
| 4,616,737 | 10/1986 | Orii ................................. | 188/184 |
| 4,912,806 | 4/1990 | Orii et al. ....................... | 16/64 |
| 4,979,261 | 12/1990 | Lasier et al. .................... | 16/64 |
| 5,048,151 | 9/1991 | Orii et al. ....................... | 16/64 |

FOREIGN PATENT DOCUMENTS

0093258 8/1978 Japan .................. 188/267

*Primary Examiner*—Robert J. Oberleitner
*Assistant Examiner*—Chris Schwartz
*Attorney, Agent, or Firm*—McAulay Fisher Nissen Goldberg & Kiel

[57] ABSTRACT

According to the invention, there is provided an input responsive damper comprising a worm wheel for being rotationally driven by an object of damping, a worm for being rotated by the worm wheel, a guide for movably guiding along the axis of the worm a worm support member rotationally supporting the worm, a biasing device for biasing the worm support member in the direction opposite to the direction of the biasing force of the worm wheel applied to the worm and a damping device having a combination of a magnet and a conductor arranged concentrically around the rotary axis of the worm, the magnet and the conductor rotating relative to each other, either of the magnet and the conductor being supported by the worm and the other being supported by a stationary member. This induction type damper provides greater than normal damping when greater than normal force is applied by the object of damping. Frictional type and fan type damping enhancement element are also disclosed. Such an input responsive damper has the capability of increasing its damping effect as it axially moves when it is subjected to excessively large rotary force without contacting the object of damping. Therefore, an input responsive damper can generate damping force automatically and reliably as a function of the applied rotary force without generating noise.

16 Claims, 5 Drawing Sheets

INPUT RESPONSIVE DAMPER

BACKGROUND OF THE INVENTION

1. Field of the Invention

This invention relates to an input responsive damper for generating damping force as a function of the magnitude of externally caused rotary movement.

2. Prior Art Background

A damper is known for reducing the speed of a moving member, e.g. a door, by engaging itself with the moving member (the object of damping) by way of a worm which is rotating at a high rate. Dampers of this category may be subdivided into two types: those of a friction damping type which are popularly used for governors of music boxes and those of a non-contact type that utilize induced electromotive force generated by electromagnetic induction. While a damper of the former type has the advantage of being capable of producing strong damping force, it cannot control its damping effect and generates large frictional noise when it is subjected to a large rotary force.

A prior art device of this type is that disclosed in U.S. Pat. No. 4,616,737.

A damper of the non-contact type is realized by providing a combination of a magnet and a stationary member which are rigidly fitted together as well as that of a conductive member and a worm which are also rigidly bound together so as to induce electromotive force by relative rotation of the conductive member and the magnet when the worm is rotated by the rotary movement of the object of damping by way of a worm wheel. It is a well known fact that relative movement of a conductive member and a magnet which are juxtaposed induces electromotive force so that a magnetic flux may be produced in the conductive member to undo any changes taking place in the state of the existing magnetic flux running through the conductive member. Therefore, the damping force generated in a damper of the second type will be increased as the relative speed of the conductive member and the magnet or the rate of rotation of the worm becomes high. On the other hand, the magnitude of the induced electromotive force can be controlled by modifying the surface area of the magnet and the of the conductive member that face each other. Since a damper of this type can generate a damping effect without contacting the object of damping, it is advantageous in terms of low noise and wear-resistivity.

PROBLEM TO BE SOLVED BY THE INVENTION

A damper of the type as described above, however, always exerts damping force at a preset level once the level is set for the damper until a different level is selected. This means that, even if excessively large rotary force is applied to the worm and damping force of a level much higher than the present level is required to damp the applied rotary force, the worm cannot effectively damp the applied rotary force. In other words, the level of the damping force to be generated by the worm cannot be modified in response to the magnitude of the rotary force applied to the worm by the object of damping.

If, for instance, a damper of this known type is used as a door closer of a swing door for moderating the rotary speed of the closing door and the door is suddenly swung by, say, a gust of wind, the damper will become ineffective and consequently the door will be shut abruptly and violently.

It is therefore the object of the present invention to provide an input responsive damper that automatically modifies its damping force as a function of the rotary movement of its worm that varies in response to the movement of the object of damping.

SUMMARY OF THE INVENTION

According to the invention, the above object is achieved by providing, in a damping device for being coupled to an object of damping, wherein the device has a worm rotationally driven by the object of damping and damping means responsive to the rotational movement of the worm caused by force applied to the device by the object of damping, the improvement comprising damping enhancement means coupled to the worm and damping means for providing greater than normal damping force when greater than normal force is applied by the object of damping. In a preferred arrangement, the worm is driven by a worm wheel coupled to the object of damping and a worm support member supports the worm. The worm support is biased by biasing means opposite to direction of the force supplied by the worm wheel. The damping means includes a magnet and conductor arranged concentrically around the rotary axis of the worm with the magnet and conductor rotating relative to each other. When the worm of a damper according to the invention is rotated by the worm wheel which is rotated by the object of damping, the magnet and the conductor rotate relative to each other to induce electromotive force for producing a damping force, which suppresses the rotation of the worm and in turn damps the movement of the worm wheel that drives the worm to rotate and consequently that of the object of damping. When the biasing force applied to the worm by the worm wheel becomes too large, the worm support member, which functions as a damping enhancement means, is moved so as to increase the surface area of the magnet and that of the conductor facing each other and thereby the magnitude of induced electromotive force in order to enhance the damping force applied to the worm.

The invention will now be described in greater detail by referring to the accompanying drawings that illustrate a preferred embodiment of the invention.

BRIEF DESCRIPTION OF THE DRAWINGS

In the drawings,

FIG. 8b is a plan view of the conductor member of FIG. 8a;

FIG. 9b is a side view of the spring of FIG. 9a;

DETAILED DESCRIPTION OF THE INVENTION

Figure 7:
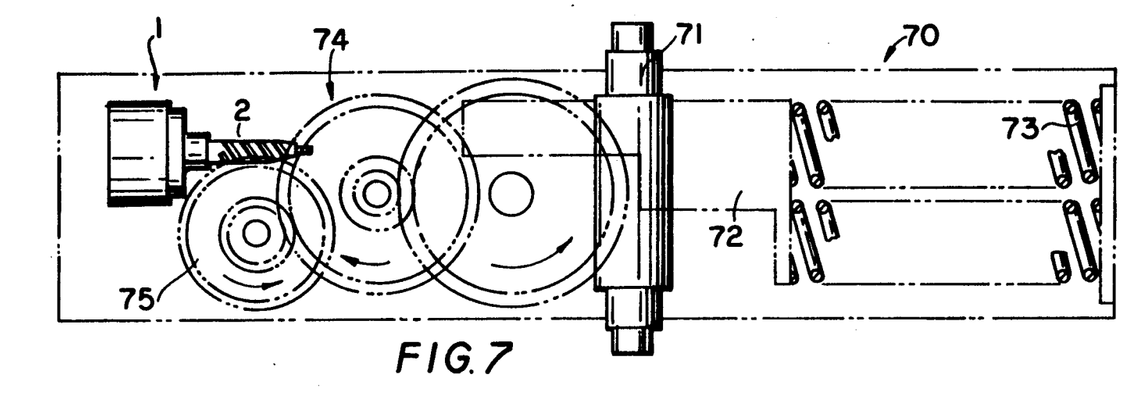
FIG. 7 is a schematic illustration of a door closer that constitutes an object of damping to which a damper according to the present invention is applied.
Figure 8A:
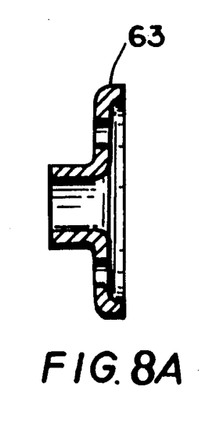
FIG. 8a is a cross section taken through 8a–8a of FIG. 8b of a conductor member of the present invention to show operation as part of a clutch for overload prevention.
Figure 8B:
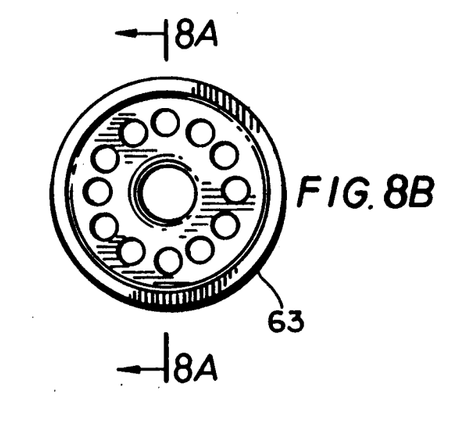
Figure 9A:
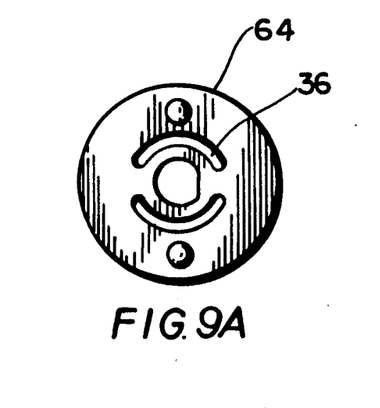
FIG. 9a is a plan view of the spring element forming part of the overload clutch of the present invention.
Figure 9B:
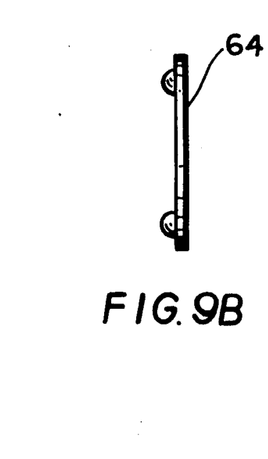

Referring firstly to FIG. 7, a door closer is schematically illustrated which constitutes an object of damping to which an input responsive damper according to the invention is applied. The door closer 70 is rigidly fitted to a door or door frame (not shown). Input shaft 71 of the door closer 70 is connected to the door or door frame by way of a link (not shown) so that it rotates as the door is opened or closed. The input shaft 71 is rotated in a given sense when the door is opened and pushes rack 72 which is engaged with a pinion section formed on it to store physical power in spring 73. When the action of opening the door is abandoned, the input shaft 71 begins to rotate in the opposite way to close the door as the spring releases the power it has stored. When the door is being closed, the rotation of the input shaft 71 or the movement of the rack 72 is transmitted of the input responsive damper 1 by way of an array of toothed wheels 74, which input responsive damper 1 by turn damps the rotary movement of the input shaft 71 until the door swings back at a predetermined constant rotary speed. The gear train 74 is an array of over-drive toothed wheels having a worm wheel 75 arranged at its rear end. The worm wheel 75 is in constant engagement with worm 2 of the input responsive damper 1. Thus, when the door is closed, the worm 2 rotates at a high rotary speed.

The input responsive damper 1 is configured in the following manner.

Figure 1:
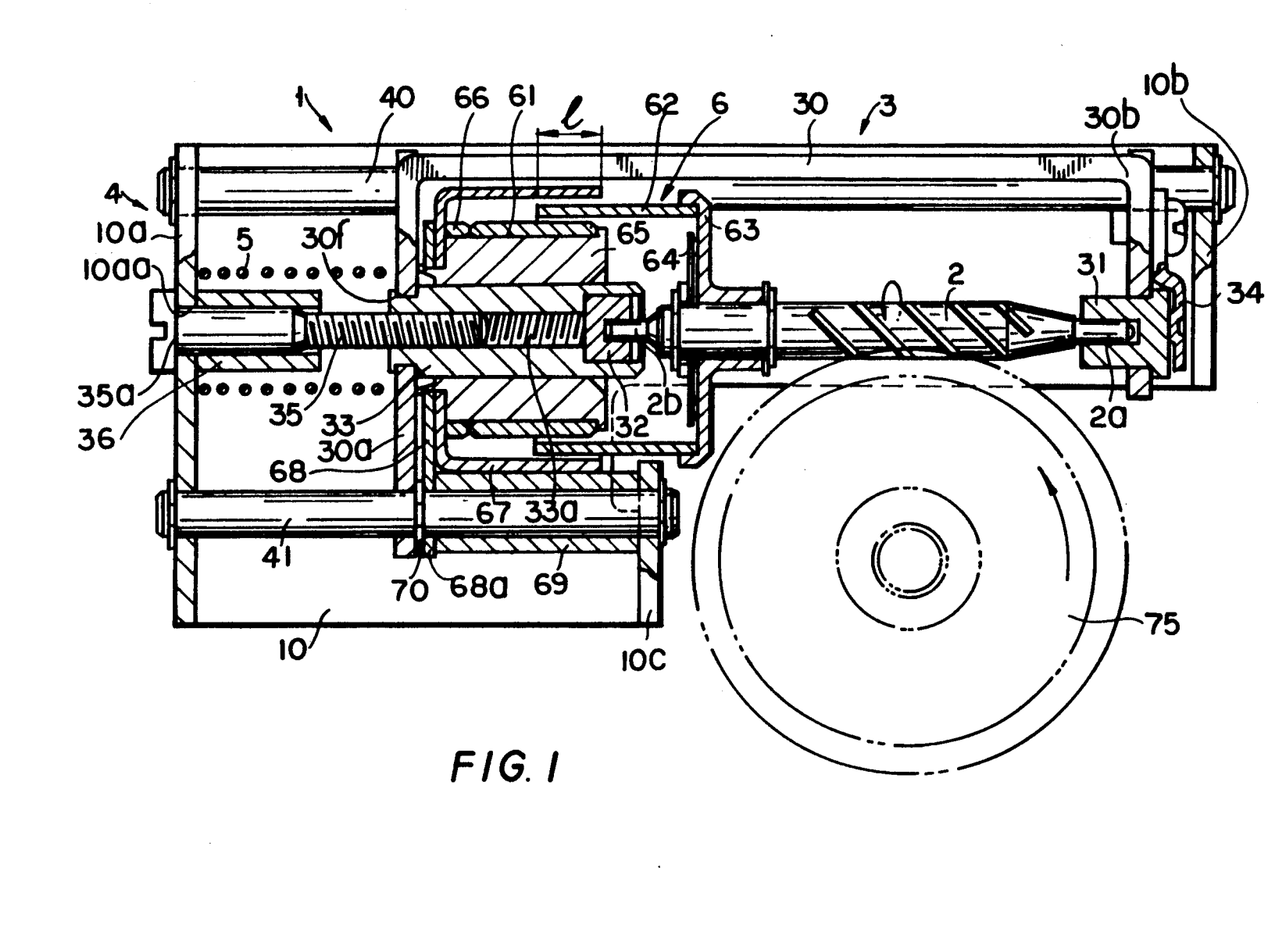
FIG. 1 is a sectional view of a preferred embodiment of the invention.
Figure 3:
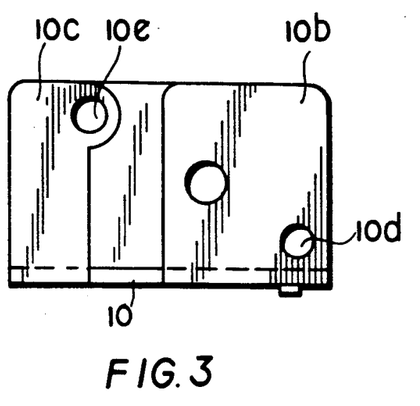
FIG. 3 is a side view of the base plate of the embodiment of FIG. 1.

As seen in FIG. 1, the input responsive damper 1 comprises, aside from the combined worm wheel 75 and worm 2, a worm support member 3 for rotationally supporting the worm 2, a pair of guide shafts 40, 41 that constitute guide means 4 for guiding the worm support member 3 movably along the axis of said worm 2, a coil spring 5 for biasing worm 2 to a given direction and damping means 6 which is constituted by a magnet 61 and a conductor 62, to be described below. The guide shafts 40, 41 are arranged in parallel with the axis of rotation of the worm 2 supported at their both ends by standing sections 10a, 10b, 10c of a base plate 10 as they run through and are received in bores provided in these standing sections (see FIG. 3). Notations 10d and 10e in FIG. 3 indicate the bores through which the ends of the guide shafts 40, 41 run.

Figure 4:
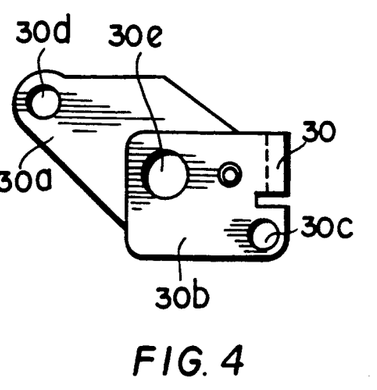
FIG. 4 is a side view of the worm support plate of the embodiment shown in FIG. 1.
Figure 5:
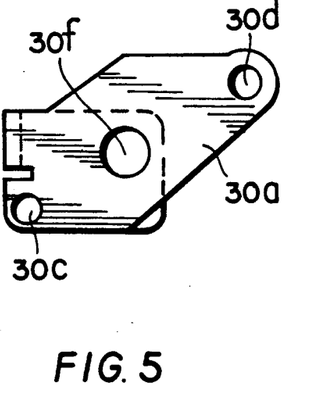
FIG. 5 is a different side view of the worm support plate of FIG. 4 as seen from the opposite side.

The worm support member 3 comprises a worm support plate 30 having a bent section 30a, through which both of the guide shafts 40, 41 run, and another bent section 30b, through which only the guide shaft 40 runs, a bearing 31 for receiving an end 2a of the worm 2, another bearing 32 for receiving the other end 2b of the worm 2 and a screw sleeve 33 having one of its ends engaged with the bearing 32 for supporting the same and the other end rigidly fitted to the bent section 30a by-means of riveting. The bearing 31 is held to the worm support plate 30 by a bearing cap 34 which is rigidly fitted to the bent section 30b. In FIGS. 4 and 5, notations 30c, 30d respectively denote bores through which the guide shafts 40, 41 slideably run, while notation 30e denotes a bore for holding the bearing 31 and notation 30f denotes a bore for rigidly holding an end of the screw sleeve 33 by means of riveting. The screw sleeve 33 is provided with a threaded bore 33a running along the axis of the worm so that said threaded bore is engaged with a adjuster screw 35, which idly runs through a bore 10a formed in the standing section 10a. The head 35a of the adjuster screw 35 is engaged with the bent section 10a. The adjuster screw 35 is radially surrounded by a stopper 36 for blocking the axial movement of the worm. The bearings 31, 32 are made of synthetic resin.

Figure 2:
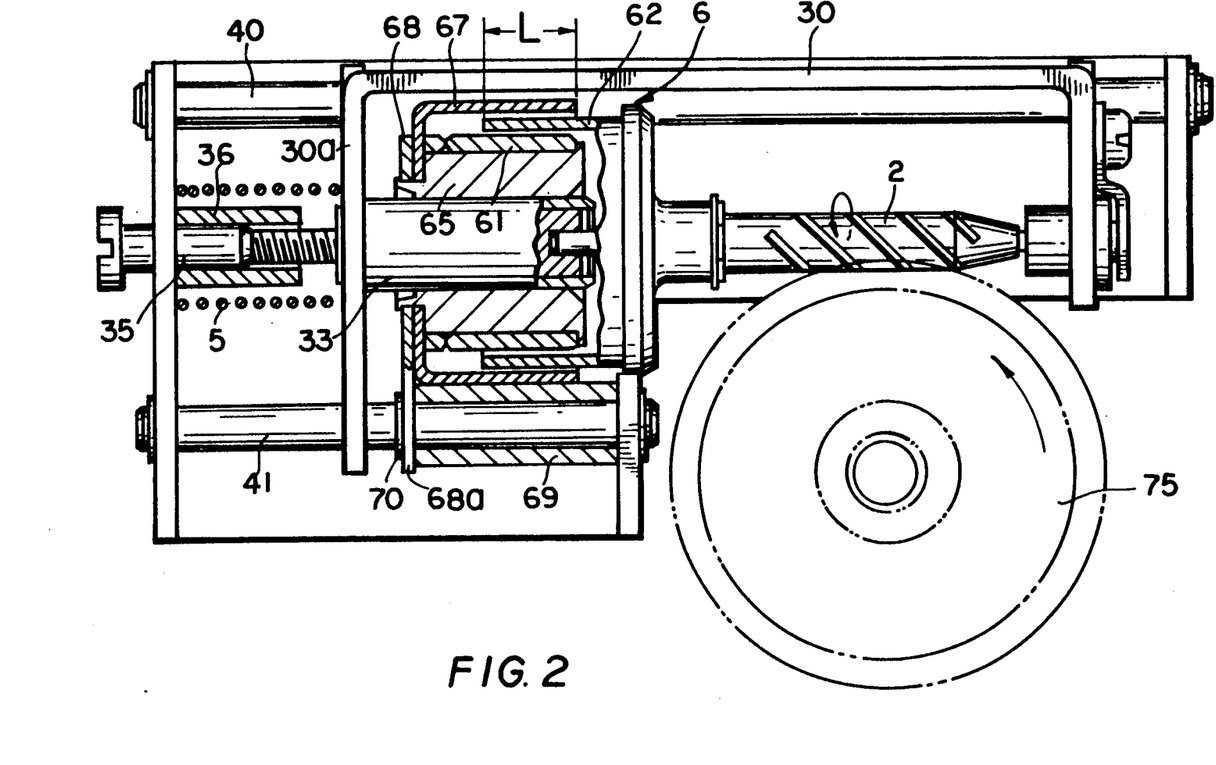
FIG. 2 is a view similar to FIG. 1, where the damper is subjected to excessively large rotary force.

An expansible coil spring 5 is arranged around the stopper 36 between the standing section 10a of the base plate and the bent section 30a of the worm support member 3 and presses the worm 2 in the direction opposite to the direction in which it is biased by rotation of the worm wheel 75 in the sense as indicated by an arrow in FIGS. 1 and 2.

The conductor 62 of the damping means 6, which is made of a magnetic material, has a hollow cylindrical shape and is rigidly fitted to a conductor holder 63 which is rotationally supported by the worm 2. The rear end of the worm 2 is partially cut out to have a D-shaped section and an overload prevention spring 64 which is in fact a leaf spring which is arranged around said cut out area of the worm 2 and is engaged therewith to restrict axial movement of the worm 2. Spring 64 has radially extending arms whose outer ends are engaged with the conductor holder 63 so that rotary movement of the worm 2 is transmitted to the conductor 62, although the engagement of the spring 64 and the conductor holder 63 is released whenever the conductor 62 is charged with an overload during the time the damper is operational in order to cut off any transmission of rotary movement of the worm to the conductor.

Figure 6:
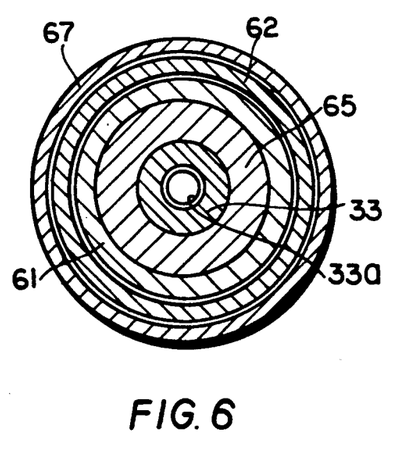
FIG. 6 is a longitudinal sectional view of the magnet and the conductor of the embodiment of FIG. 1, showing their positional relationship.

The outer periphery of the screw sleeve 33 is idly surrounded by a magnet holder 65, which is made of a magnetic material and forms an integral part of a magnet 61 that surrounds the magnet holder 65 to be supported by the latter as the magnet 61 lightly presses the holder or is firmly bonded thereto. The magnet 61 is realized in the form of a hollow cylinder having N-poles and S-poles arranged alternately along its periphery. As seen from FIG. 6, magnet 61 is coaxial with the conductor 62 relative to the axis of rotation of the worm 2 and peripherally surrounded by the latter with space provided therebetween. A stationary member 68 is riveted to an end of the magnet holder 65 with a spacer and a cup-shaped yoke arranged therebetween. The anchoring end 68a of the stationary member 68 is engaged with the guide shaft 41. A spacer 69 is provided around the guide shaft 41 which is arranged between the standing section 10c of the base plate 10 and the anchoring end 68a, spacer 69 cooperating with a retaining ring 70 for restricting axial movement of the stationary member 68 (see FIG. 2). A magnetic field is produced between the magnet 61 and the yoke 67 and conductor 62 is located within a part of the magnetic field without contacting any of the surrounding members. It should be noted that the stationary member 68 which is rigidly fitted to the base plate with the guide shaft 41, the spacer 69 and the retaining ring 70 arranged therebetween constitutes an immovable member of the embodiment. Thus, while the conductor 62 which is integral with the worm 2 can be rotated therewith is therefore movable along the axis of the worm 2, the magnet 61 remains immovable as it is supported by the stationary member 68.

As illustrated in FIG. 7, the damper 1 is fitted to the inside of the door closer 70 that constitutes the object of damping.

The embodiment having the configuration described above operates in the following manner. Referring to FIG. 7, when the door (not shown) is opened, the toothed wheels of the gear train 74 are forced to rotate in the senses opposite to those indicated by arrows although the worm wheel 75 which is arranged at the rear end of the gear train 74 is blocked against rotation by a one-way clutch provided at the gear train. When the door is being closed by the righting movement of the coil spring which occurs as the energy stored in the spring is released, the toothed wheels of the gear train 74 are rotated in the senses indicated by the respective arrows, including the worm 2 which is rotated by way of the worm wheel 75. At this state, the worm 2 is subjected to a force applied to it by the worm wheel 75 that tends to bias it toward the left as shown in FIG. 1. However, the worm 2 is not actually biased leftward because the coil spring 5 is so selected that it can block any axial movement of the worm 2 caused by rotation of the worm wheel 75 generated solely by the righting force of the coil spring 73 when the door is being closed.

Referring to FIG. 1, if the worm 2 is rotated, the conductor 62 is rotated by it by way of the spring 64 within the magnetic field generated by the magnet 62 and the yoke 67 and induces electromotive force as it crosses the magnetic flux in the field. The magnitude of the induced electromotive force is proportional to the rate of rotation of the conductor 62, if the area of the surface of the conductor 62 that faces its counterpart of the magnet 61 is constant and vice versa, and therefore significantly large damping force is applied to the rotating conductor 61.

In other words, if the door is being closed at a relatively low rate of rotation, the induced electromotive force will also be relatively small because the worm 2 rotates at a relatively low rotary speed. On the other hand, however, if the door is being closed at a relatively high rate of rotation, a relatively large electromotive force, and thereby a will be induced to effectively damp the rotary speed of the closing door because the worm 2 is rotated at a high rate of rotation and consequently applies a relatively large force to the door.

The rotary speed at which the door is closed when it is not subjected to any external force, or when the door is closed solely by the righting force of the coil spring 73 (see FIG. 7), is determined by the areas of the opposing surfaces of the magnet 61 and the conductor 62. FIG. 1 illustrates a condition where the areas of the opposing surfaces of the magnet and the conductor are (or the length of the portion of the conductor located within the magnet is minimal and consequently the generated damping force is at the lowest functional level. In order to increase the damping force under this condition, the adjuster screw 35 is rotated so that the screw sleeve 33 which is engaged with it is moved leftward along the guide shafts 40, 41. As the screw sleeve 33 moves leftward, the worm support plate 30 which is integral with the sleeve is also moved leftward with the worm 2 supported by it until the conductor 63 enters deep into the magnetic field between the magnet 61 and the yoke 67 so that the length of the portion of the conductor located within the magnet is increased. Consequently, the density of the flux crossed by the conductor increases to induce a large electromotive force and damping force which in turn damps the closing speed of the door.

Now, if the door which is being opened is violently and abruptly closed by hand or by a gust of wind, the toothed wheels of the gear train 74 come to rotate faster than when they are driven solely by the righting force of the coil spring 73. Consequently, the worm 2 is driven by the worm wheel 75 to rotate at a high rate of rotation. If the biasing force of the worm wheel 75 applied to the worm 2 exceeds the righting force of the coil spring 5, the worm 2 is moved leftward along with the worm supporting plate 30 that supports the worm 2 as viewed in FIG. 1.

FIG. 2 illustrates a condition as described above. As the worm support plate 30 is moved relative to the magnet 61 located at its stationary position against the elastic force of the coil spring 5, the length of the portion of the conductor 62 that is found within the magnetic field formed by the magnet 61 and the yoke 67 is now L(>). Consequently, the density of the magnetic flux crossed by the conductor 62 is increased to induce electromotive force and therefore apply damping force to the worm 2 at an enhanced level. As the worm 2 is subjected to damping force at an enhanced level, the rate of rotation of the worm wheel 75 and the other toothed wheels of the gear train 74 which are being rotated for closing the door is reduced and the force applied to the closing door is damped so that it will be closely slowly. If the force applied to the door to close it abruptly and violently is removed or reduced and therefore the force that tries to bias the worm 2 is lessened, the worm support plate 30 regains its original position as shown in FIG. 1 by the righting force of the coil spring 5 and so the position of the conductor 62 relative to the magnet 61 will be the one defined above as its proper position. As a result, the damping force applied to the worm 2 will become minimal.

When the force that biases the worm 2 is considerably large, the worm support plate 30 will be placed further left than the position illustrated in FIG. 2 and, in an extreme case, its bent section 30a abuts the stopper 36 so that the worm 2 may not be moved any further. The damping force will be maximum under this extreme condition and, if any excessive rotary force is further applied to the worm 2, the overload prevention spring 64 is elastically deformed to release its engagement with the conductor holder 63 so that the worm 2 may rotate by itself. The spring 64 effectively avoids any risk of damage that may take place to the worm 2 as well as to the bearings 31, 32. Note that if the worm wheel 75 and the other toothed wheels of the gear train are provided with an overload prevention mechanism, the conductor 62 may be directly bonded to the worm 2 without using the spring 64.

While the worm 2 is provided with a conductor 62 and a magnet 61 is rigidly fitted to an immovable member, they may be arranged the other way. Besides, since the worm wheel 75 rotates the worm 2 with a high speed-up ratio, it does not necessarily need to constitute the final state of the speed-up gear train. The only requirement for the worm wheel 75 is that it rotates in response to the movement of the object of damping.

Figure 10:
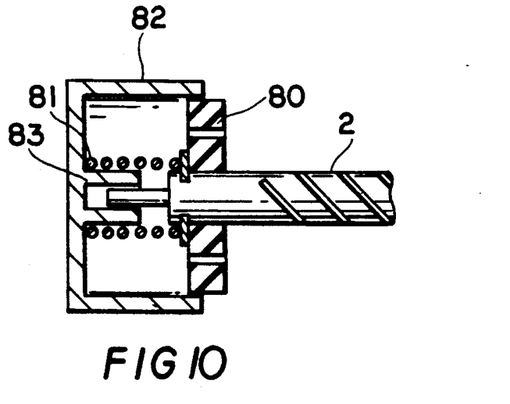
FIG. 10 is a cross-sectional view of a second embodiment of the present invention employing a friction method for providing enhanced clamping.
Figure 10A:
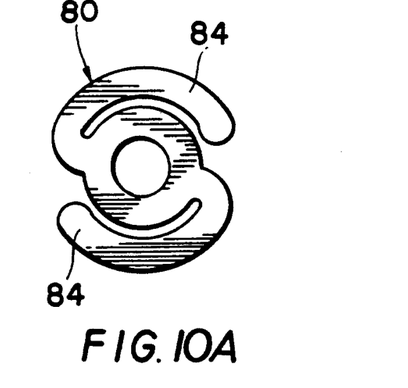
FIG. 10a is a plan view of the friction plate of the embodiment of FIG. 10.
Figure 11:
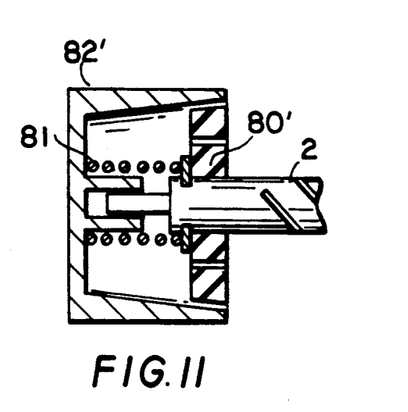
FIG. 11 is a cross-sectional view of a modification of the embodiment of FIG. 10.

A second embodiment of the invention for providing an enhanced damping effect for compensating for greater than normal force applied by the object of damping is shown in FIGS. 10, 10a and 11. In this embodiment, the increased damping is created by frictional engagement between a movable friction plate 80 and a stationary cup 82. The movable friction plate 80 is preferably composed of rubber and is rotatably affixed to a shaft forming an extension of the worm 2. The shaft of the worm is biased for ordinary damping operation by action of a spring 81. The stationary cup includes a guide element 83 for accepting and guiding a projection forming part of the worm shaft. In a normal operating condition, the friction plate is disposed at the entrance to the cup and makes little frictional engagement with the interior surface of the cup. When a larger than normal force is applied to the worm 2 by the object of damping, so as to exceed the biasing force of spring 81, the friction plate 80 will move into the cup 82 so as to cause an increasingly greater frictional damping effect.

In FIG. 10a, a preferred shape of the frictional plate 80 is shown. It is basically an "S" shape, having two arms 84. The arms have a spring-like action to be able to press outwardly against the internal surface of the cup.

In FIG. 11, the basic elements are similar to that in FIG. 10 and 10a, except that the internal walls of the cup 82' and the outer walls of the friction plate 80''are sloped at approximately the same angle. Again, in this arrangement, the friction plate touches the inner wall of the cup with a low amount of friction in a normal damping operation. When a larger than normal force is applied by the worm 2, the friction plate will move into the cup to provide a greater damping effect.

Figure 12:
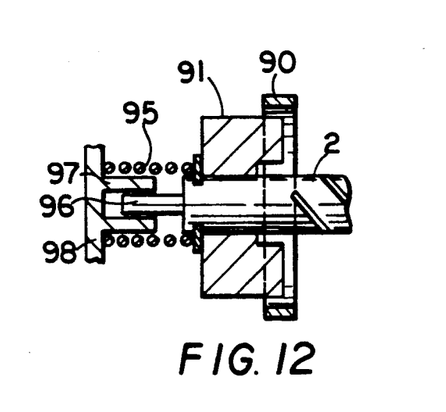
FIG. 12 is a cross-sectional view of a third embodiment of the present invention for providing enhanced damping employing a fan method
Figure 12A:
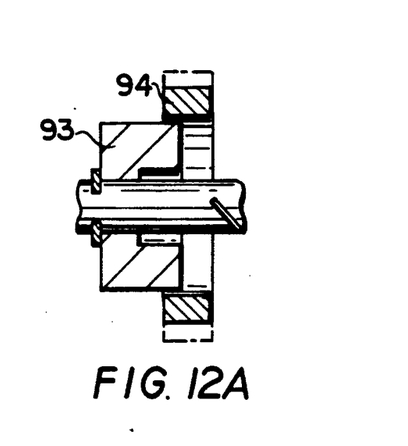
FIG. 12a is partial cross sectional view and FIG. 12b is a partial plan view of the fixed and movable portions of embodiment of FIG. 12.
Figure 12B:
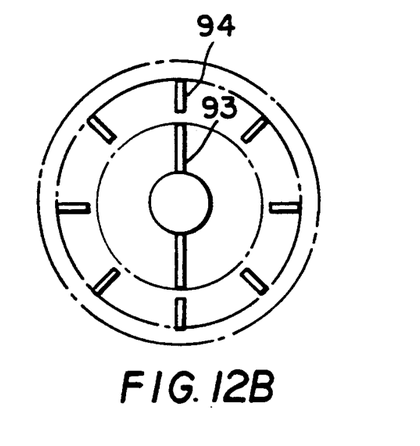

FIGS. 12, 12a and 12b illustrate a third embodiment of the present invention. In this arrangement, a fan element is used in a first, restricted condition for normal operation and a second unrestricted condition for providing increased damping. In FIG. 12, a fan element 90 is affixed to a shaft coupled to worm 2. The fan and shaft is adapted to move against biasing force provided by spring 95. The shaft includes a projection which is slidingly mounted in a hollow guide 96 forming part of a fixed wall 98 of the damper. Around a portion of the fan close to the worm is a fixed ring 90. The fixed ring 90 blocks part of the air circulated by the fan. A certain amount of damping will be provided in the condition shown in FIG. 12 (the normal condition). When a greater than normal force is provided by the object of damping, the worm force overcomes the spring bias force and the fan moves away from the ring. In this condition, the fan is unrestricted and greater damping will occur because the fan will be moving more air.

In FIGS. 12a and 12b, the ring is replaced by a fixed set of fins 94. The fan 93 and fins 94 function in a manner similar to the fan 91 and ring 90 of FIG. 12.

Application of an input responsive damper according to the invention is not limited to a door closer as described above but the invention can also be used with a machine or apparatus for the purpose of adjusting its moving speed or the moving speed of any of its components.

As is apparent from the above description, an input responsive damper according to the invention can increase its damping effect as it axially moves when it is subjected to excessively large rotary force without contacting the object of damping. Therefore, an input responsive damper according to the invention can generate damping force automatically and reliably as a function of the applied rotary force without generating noise.

While the foregoing description and drawings represent the preferred embodiments of the present invention, it will be obvious to those skilled in the art that various changes and modifications may be made therein without departing from the true spirit and scope of the present invention.

What is claimed is:

1. In a damping device for being coupled to an object of damping, said device having a worm with a longitudinal axis and being rotationally driven by said object of damping and damping means responsive to the rotational movement of the worm caused by force applied to the device by the object of damping, the improvement comprising:

damping enhancement means which supports said worm slideably along its longitudinal axis and damping means for providing an increased damping force when said worm slides along its longitudinal axis.

2. The damping device of claim 1 wherein said damping means includes induction members for providing an induction force and said damping enhancement means increases said induction force between said induction members and thereby the damping force.

3. The damping device of claim 2 wherein the damping enhancement means operates to increase adjacent surface areas of the induction members in order to increase the damping force.

4. The damping device of claim 3, wherein the damping device includes a worm wheel coupled to the object of damping for driving said worm, worm guide means for movably guiding said worm support means along the axis of the worm and biasing means for biasing said worm support means in the direction opposite to the direction of the force of the worm applied to the worm and the damping means includes a magnet and a conductor arranged concentrically around the rotary axis of the worm, said magnet and said conductor rotating relative to each other, either of said magnet and said conductor being supported by said worm and the other being supported by a stationary member, adjacent surface areas of said conductor and magnet being increased to provide damping enhancement by applying a biasing force to the worm in excess of the force supplied by said biasing means so as to move said worm support means.

5. The damping device of claim 4 including means for adjusting the amount of damping force supplied by said damping means.

6. The damping device of claim 5 wherein said adjusting means adjusts the relative surface area overlap between said magnet and said conductor.

7. The damping device of claim 5 wherein said adjusting means is a screw having a stopper for blocking axial movement of said worm beyond a predetermined point along the device.

8. The damping device of claim 2 including clutch means for preventing movement of one of said induction members relative to the other when an overload force is applied to one of the members.

9. The damping device of claim 4 wherein said conductor is driven by said worm and clutch means are included for preventing rotary transmission from said worm to said conductor when an overload force is applied to said worm.

10. The damping device of claim 1 wherein the damping device includes biasing means for biasing said worm support means in the direction opposite to the direction of force applied to the worm and wherein said damping means activates said damping enhancement means by applying a biasing force to the worm in excess of the force supplied by the biasing means to move the worm support.

11. The damping device of claim 1 wherein the damping means includes friction members and friction force between said friction members and thereby the damping force.

12. The damping device of claim 1 wherein the damping means includes a fan and fan restricting member and said damping enhancement means includes means for increasing air movement by the fan and thereby the damping force.

13. The damping device of claim wherein the friction members include a fixed cup and a friction plate affixed to a movable member, said movable member and said friction plate moving into the cup by the damping enhancement means to provide increased damping force when greater than normal force is applied by the object of damping.

14. The damping device of claim 11 wherein the fan is affixed to a movable member and the fan restricting member is fixed, said movable member and said fan moving away from the fan restricting member to provide increased damping when greater than normal force is applied by the object of damping.

15. The damping device of claim 14 wherein the fan restricting member includes a solid ring.

16. The damping device of claim 14 wherein the fan restricting member includes a plurality of tins disposed annularly about the fan.

* * * * *